Sept. 11, 1962  G. B. SELLERS  3,052,940
LOCKING PIN

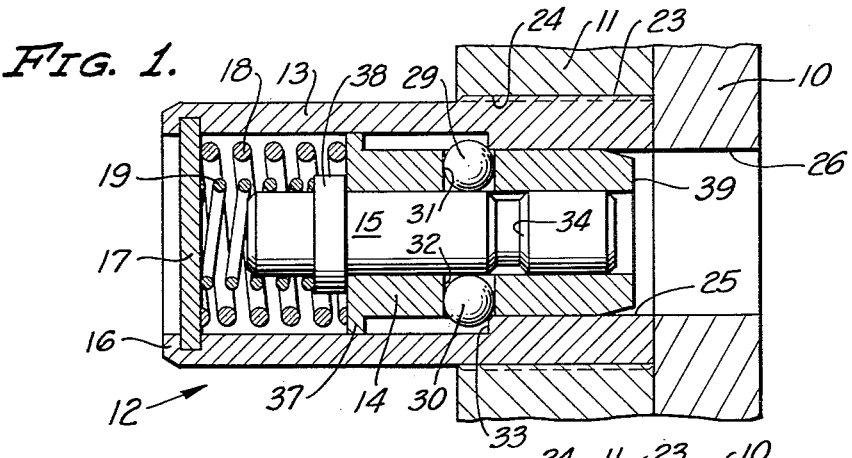
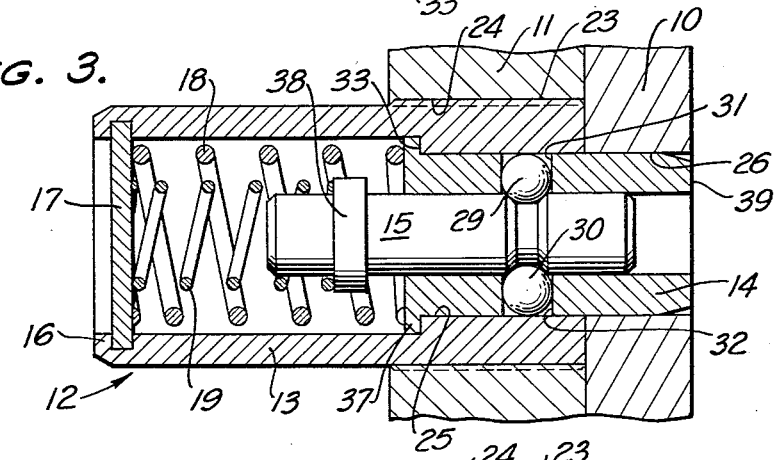
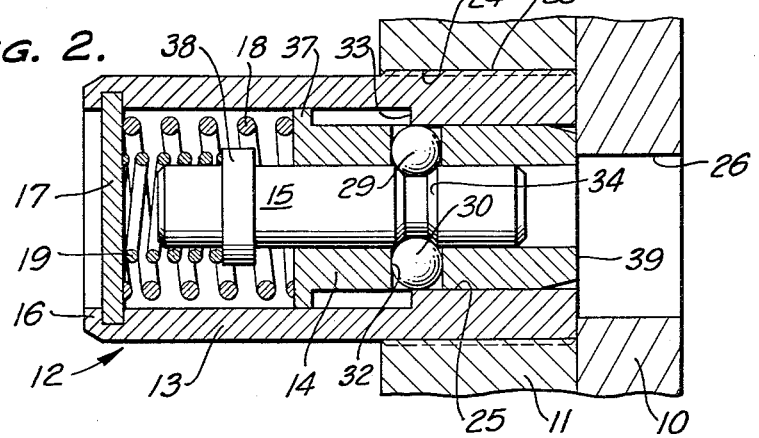

Filed April 28, 1959  2 Sheets-Sheet 2

INVENTOR
GOSE B. SELLERS
BY HIS ATTORNEYS
HARRIS, KIECH, RUSSELL & KERN

United States Patent Office 3,052,940
Patented Sept. 11, 1962

3,052,940
LOCKING PIN
Gose B. Sellers, Los Angeles, Calif., assignor, by mesne assignments, to Aerpat A.G., Glarus, Switzerland, a corporation of Switzerland
Filed Apr. 28, 1959, Ser. No. 809,372
7 Claims. (Cl. 24—211)

This invention relates to a fastener or locking pin for joining two or more members through aligned openings in the members.

It is an object of the invention to provide a fastener of the detent type which is fastened in place by pushing on one element and unfastened by pushing on a different element. A further object is to provide such a fastener which can be separable from the members being joined and which can be adapted to be carried by one of the members.

It is an object of the invention to provide a fastener which can be inserted into aligned openings of a plurality of members and which is locked in place by pushing on a portion of the fastener. A further object is to provide such a fastener which may be flush with an outer surface of the joined members when locked in place. A further object is to provide such a fastener which can be unlocked by pushing on a portion of the fastener. Another object is to provide such a fastener which can be repeatedly used for joining members together requiring only that the members have aligned openings therein.

It is an object of the invention to provide a fastener which can be carried on one of the members providing a flush surface for contact with another member with a portion of the fastener being projectable to enter a fastener opening in the other member. A further object is to provide such a fastener wherein the fastener body is carried below the surface of the one member when in the retracted position and may be released to move to a position flush with the one member contacting the other member though the fastener opening is misaligned so that when the openings are subsequently aligned, the fastener body will automatically enter the opening and complete the fastening operation.

It is an object of the invention to provide a fastener having telescoping receptacle, body and plunger, with the body carrying a laterally moving detent engageable with the receptacle to lock the body in a retracted position with the plunger in an extended position and engageable with the plunger to lock the body in an extended position with the plunger in a retracted position, the fastener including spring means separately urging the body and the plunger to their extended positions.

The invention also comprises novel details of construction and novel combinations and arrangements of parts which will more fully appear in the course of the following description. The drawings merely show and the description merely describes preferred embodiments of the present invention which are given by way of illustration or example.

In the drawings:

FIG. 1 is a sectional view of a preferred embodiment of the invention with the body in the retracted position;

FIG. 2 is a view similar to that of FIG. 1 with the body in an intermediate position;

FIG. 3 is a view similar to that of FIG. 1 with the body in the extended position;

Figure 4:
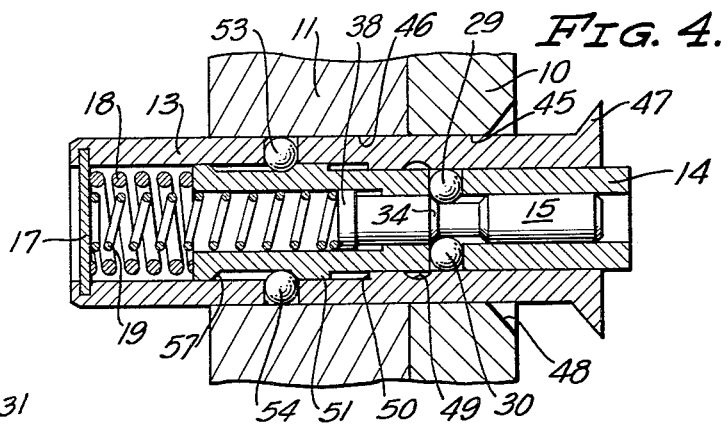
FIG. 4 is a sectional view of an alternative form of the invention showing the fastener being inserted in aligned openings of members to be joined.
Figure 7:
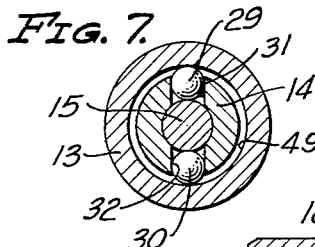
FIG. 7 is a sectional view taken along the line 7—7 of FIG. 5.

Referring to the embodiment of FIGS. 1, 2 and 3, members 10 and 11 are being joined by a fastener 12. The fastener includes a telescoping receptacle 13, body 14 and plunger 15. The end 16 of the receptacle is closed by a plate 17 which may be held in place by spinning over the lip of the receptacle or by other suitable means. A body spring 18 is compressed between the plate 17 and the body 14, urging the body to the right to its extended position. A plunger spring 19 is compressed between the plate 17 and the plunger 15, urging the plunger to the right to its extended position.

In this embodiment, the receptacle 13 is fixed in the member 11 which may be accomplished by providing axial knurling or serrations 23 on a portion of the outer surface of the receptacle and pressing it into an opening 24 in the member 11 so that the bore 25 of the receptacle may be aligned with an opening 26 in the member 10.

A detent in the form of spherical balls 29, 30 is carried on the body 14, the balls being laterally movable in openings 31, 32, respectively, between an inwardly projecting position as seen in FIGS. 2 and 3 and an outwardly projecting position as seen in FIG. 1. The diameter of each ball is greater than the thickness of the wall of the body so that the ball will either project outward from the body for engaging a shoulder 33 of the receptacle or project inward from the body for engaging a groove 34 in the plunger.

A flange 37 on the body 14 limits or terminates the movement of the body at its extended position by engaging the shoulder 33 of the receptacle. Similarly, a flange 38 on the plunger 15 limits or terminates movement of the plunger at its extended position by engagement with the body.

In FIG. 1, the fastener is shown in its unfastened condition with the body 14 in the retracted position and the plunger 15 in the extended position. The fastener is placed in this condition by pushing the body 14 to the left against the urging of the spring 18. The balls 29 and 30 will be engaging the groove 34 of the plunger 15 and will carry the plunger to the left with the body against the urging of the spring 19 until the body moves to the position shown in FIG. 1. At this time, the balls will move outward engaging the shoulder 33 of the receptacle and the spring 19 will urge the plunger to the right to its extended position as seen in FIG. 1. In the preferred form of the invention, the body 14 is dimensioned so that its end 39 will be below the surface of the member 11 as seen in FIG. 1.

With the body retracted, the member 10 is positioned against the member 11, either with the opening 26 aligned with the bore 25 as seen in FIG. 1 or misaligned as seen in FIG. 2. Now the plunger 15 is pushed to the left against the urging of the spring 19 permitting the balls 29, 30 to move inwardly into the groove 34 of the plunger. Then the pressure on the plunger is released and the plunger and body move to the right urged by the springs 19, 18, respectively. If the member 10 is misaligned, the body will come to rest against the member as seen in FIG. 2. Then the member 10 can be moved slightly relative to the member 11 to bring the opening into alignment with the bore at which time the body will automatically be projected into the opening, thereby locking the members together as shown in FIG. 3. Of course, if the members are aligned when the plunger is depressed, the body will immediately move to its fully extended position. The end 39 of the body is tapered to facilitate alignment of the member 10 with the member 11.

A typical application for this fastener is in affixing nose cones to missile bodies and the like where one or more fasteners are carried on the missile body corresponding to the member 11 and the nose cone corresponds to the member 10. The body of each fastener is pushed to the retracted position. Then the nose cone is placed in position and each plunger is depressed to release the body of the fastener. Then the nose cone is rotated to exactly align the openings and each body pops into place when alignment is achieved. The fastener may be released by pushing on the body to move it to its retracted position.

This fastener provides a unit which may be flush mounted in a first member and which may be made flush with a second member when the two members are joined. Furthermore, the fastener is both fastened and unfastened by pushing on an exposed portion of the fastener, thus providing a simple yet positive type of operation.

Figure 5:
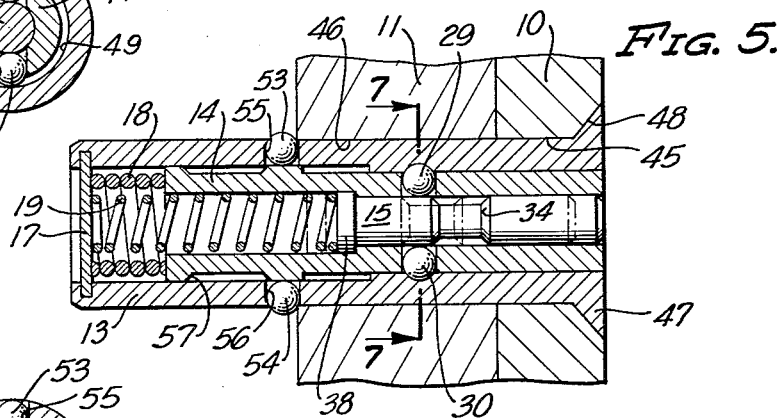
FIG. 5 is a view similar to that of FIG. 4 showing the members in the fastened condition.
Figure 8:
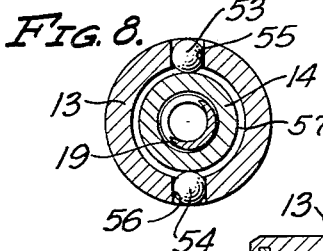
FIG. 8 is a sectional view taken along the lines 8—8 of FIG. 6.

In the alternative embodiment shown in FIGS. 4–8, the fastener is removable from the members being joined and means are provided for locking the receptacle in place to fix the members together. Elements identical to those of the embodiment of FIGS. 1–3 are identified by the same reference numerals. The receptacle 13 is a sliding fit in aligned openings 45, 46 of the members 10, 11, respectively. A conical head 47 on the receptacle fits into a countersink 48 in the member 10 to provide a flush surface as seen in FIG. 5. Of course, any type of head can be used.

The receptacle 13 includes an inner annular groove 49 for engagement by the balls 29, 30 carried by the body 14. The receptacle also includes an inner shoulder 50 for engagement by a flange 51 of the body to limit the movement of the body toward its extended position. The groove 49 and the shoulder 50 function in the same manner as the shoulder 33 of the first embodiment and a single shoulder can be used therefor if desired.

Figure 6:
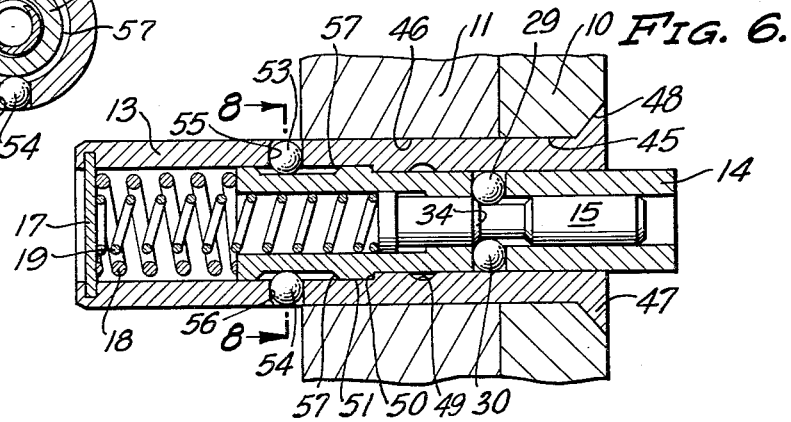
FIG. 6 is a view similar to that of FIG. 4 showing the fastener partially released.

A detent consisting of spherical balls 53, 54 positioned in lateral openings 55, 56 in the body and spaced from the head 47 a distance at least equal to the combined thickness of the members 10 and 11 provides for locking the fastener in position in the joined members. The diameter of each of the balls 53, 54 is greater than the thickness of the receptacle wall so that the balls either project outwardly from the receptacle for engaging the member 11 as seen in FIG. 5 or project inwardly from the receptacle for engaging a groove 57 in the body 14 as seen in FIGS. 4 and 6. A camming surface is provided on the right side of the groove 57 as it is positioned in FIGS. 4–6 and it will be noted from these figures that the space between this camming surface and the detent balls 29, 30 is equal to or slightly greater than the space between the detent balls 53, 54 and the groove 49.

The fastener is shown in its unlocked position in FIG. 4. The fastener is inserted into the aligned openings of the members 10, 11 by pushing to the left on the body 14. The body carries the receptacle to the left by engagement of the groove 57 with the balls 53, 54 and carries the plunger to the left by engagement of the balls 29, 30 with the groove 34. When the receptacle is fully inserted into the members being joined, the balls 53, 54 are cammed outwardly from the groove 57 into engagement with the member 11, permitting the body 14 to compress the spring 18 and bring the balls 29, 30 into alignment with the groove 49. Then the plunger spring 19 forces the plunger to the right to its extended position locking the balls 29, 30 in their outward position and locking the body in its retracted position as shown in FIG. 5. At this time, the fastener is in the locked condition joining the members together.

The fastener is released by pressing the plunger 15 to the left against the urging of the spring 19. This permits the balls 29, 30 to move to their inward position in the groove 34 as shown in phantom lines in FIG. 5, and unlocks the body 14. Then the spring 18 moves the body to the right toward its extended position, carrying the plunger therewith by engagement of the balls 29, 30 with the plunger groove. When the body 14 is moved toward its extended position as shown in FIG. 6, the balls 53, 54 move toward their inward position into the groove 57 of the body permitting the receptacle to be removed from the aligned openings.

Thus, it is seen that, as in the previous embodiment, the fastener may be both locked and unlocked by pushing on an element thereof. Furthermore, the fastener can be used to join members which have aligned openings without requiring any additional attachments or special grooves or shoulders in the members. Also, if desired, the fastener can be made flush with the outer surface of the joined members.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a fastener for joining members having aligned openings, the combination of: a receptacle having an axial bore and an annular shoulder therein, said receptacle being slidably positionable in the aligned openings; means for mounting said receptacle in the aligned opening; a body carried in said receptacle for sliding movement along the axis of said receptacle between retracted and extended positions and having means engaging said receptacle for limiting movement toward said extended position; a plunger carried in said body for sliding movement along the axis of said receptacle between retracted and extended positions, said plunger having an annular groove therein and having means engaging said body for limiting movement toward said extended position; a detent carried in said body and movable laterally between an inwardly projecting position and an outwardly projecting position with said detent adapted to engage said shoulder of said receptacle when in its outward position and to engage said groove of said plunger when in its inward position; a first spring carried in said receptacle for urging said body to its extended position; and a second spring carried in said receptacle for urging said plunger to its extended position, whereby movement of said body to its retracted position against the urging of said first spring permits said detent to move to its outward position engaging said shoulder, and said plunger urged by said second spring to move to its extended positon, and moving of said plunger to its retracted position against the urging of said second spring permits said detent to move to its inward position engaging said groove, and said body urged by said first spring to move to its extended position.

2. In a fastener for joining members having aligned openings, the combination of: a receptacle having an axial bore and an annular shoulder therein, said receptacle being slidably insertable into the aligned openings for fastening the members together; a body carried in said receptacle for sliding movement along the axis of said receptacle between retracted and extended positions, said body having a first annular groove therein and having means engaging said receptacle for limiting movement toward said extended position; a plunger carried in said body for sliding movement along the axis of said receptacle between retracted and extended positions, said plunger having a second annular groove therein and having means engaging said body for limiting movement toward said extended position; a first detent carried in said body and movable laterally between an inwardly projecting position and an outwardly projecting position with said first detent adapted to engage said shoulder of said receptacle when in its outward position and to engage said second groove of said plunger when in its inward position; a second detent carried in said receptacle and movable laterally between an inwardly projecting position and an outwardly projecting position with said second detent adapted to engage one of the members when in its outward position fixing the members together and to engage said first groove of said body when in its inward position; a first spring carried in said receptacle for urging said body to its extended position; and a second spring carried in said receptacle for urging said plunger to its extended position, whereby movement of said body to its retracted position against the urging of said first spring moves said receptacle in the aligned openings to the fastening position and permits said detents to move to their outward positions, and said plunger urged by said second spring to move to its extended position, and moving of said plunger to its retracted position against the urging of said second spring permits said detents to move to their inward positions, and said body urged by said first spring to move to its extended position.

3. In a fastener, the combination of: a receptacle having an axial bore and an annular shoulder therein; a body carried in said receptacle for sliding movement along the axis of said receptacle between retracted and extended positions and having means for engaging said shoulder when in said extended position; a plunger carried in said body for sliding movement along the axis of said receptacle between retracted and extended positions, said plunger having an annular groove therein and having means for engaging said body when in said extended position; a detent carried in said body and movable laterally between an inwardly projecting position and an outwardly projecting position with said detent adapted to engage said shoulder of said receptacle when in its outward position locking said body in the retracted position and to engage said groove of said plunger when in its inward position locking said plunger in the retracted position; a first spring carried in said receptacle for urging said body to its extended position; and a second spring carried in said receptacle for urging said plunger to its extended position, whereby movement of said body to its retracted position against the urging of said first spring permits said detent to move to its outward position engaging said shoulder, and said plunger urged by said second spring to move to its extended position, and moving of said plunger to its retracted position against the urging of said second spring permits said detent to move to its inward position engaging said groove, and said body urged by said first spring to move to its extended position.

4. A blind fastener for joining members having aligned openings comprising: a receptacle insertable through the aligned openings and having an axial bore and an internal annular groove formed therein; a tubular body slidably received in said receptacle bore, said body having an external annular groove formed therein and a camming surface on one side of said external annular groove; an enlarged external head on said receptacle to form an abutment against one of the members to be joined; a first detent mounted in said receptacle for lateral movement between an inward retracted position within said external body groove and an outward engaging position by said camming surface upon axial movement of said body, said first detent being spaced from the abutment formed by said head a distance at least equal to the combined thickness of the members to be joined; a second detent mounted in said body for lateral movement between an outward position for engagement in said receptacle groove to position said body with respect to said first detent and an inward retracted position; and means in said body for moving said second detent between inward and outward positions; the space between said first detent and said receptacle groove being less than the space between said camming surface and second detent whereby the members are retained between said first detent and abutment formed by said head when said first detent is positioned outwardly upon the axial positioning of said body by outward movement of said second detent into said receptacle groove.

5. The apparatus recited in claim 4 in which said means for moving said second detent comprises a plunger slidably received in said body and formed having an external annular groove.

6. The apparatus recited in claim 5 in which said detents comprise balls secured against axial movement in said receptacle and said body, the diameter of said balls being greater than the thickness of the wall of said receptacle and said body.

7. A blind fastener for joining members having aligned openings comprising: a receptacle insertable through aligned openings and having an axial bore, an internal annular groove and an enlarged external head; a tubular body slidably received in said receptacle bore and having an external annular groove; a first detent in said receptacle movable between inward retracted and outward engaging positions upon axial movement of said body; a second detent in said body engageable in said receptacle groove to position said body with respect to said first detent; means for moving said second detent between inward and outward positions said means including a plunger slidably received in said body and having an external annular groove whereby the members are retained between said first detent and said receptacle head when said first detent is positioned outwardly upon the axial positioning of said body by outward movement of said second detent into said receptacle groove; and means for biasing said body and said plunger toward the head of said receptacle whereby movement of said body against said biasing means automatically moves said first and second detents outwardly to their engaging positions, and movement of said plunger against said biasing means operates automatically to withdraw said second detent inwardly into said plunger annular groove and position said body to permit inward positioning of said first detent and thus removal of said receptacle from the aligned opening in the joined members.

References Cited in the file of this patent

UNITED STATES PATENTS

| 1,692,826 | Ganz | Nov. 27, 1928 |
| 2,729,417 | Maynard | Jan. 3, 1956 |